United States Patent
Yamamoto et al.

[11] Patent Number: 5,804,816
[45] Date of Patent: Sep. 8, 1998

[54] POSITION TRANSDUCER HAVING OPTICAL BEAM GENERATOR FOR COVERING WIDE DETECTABLE RANGE

[75] Inventors: Jun Yamamoto; Tsutomu Sasaki, both of Hamamatsu, Japan

[73] Assignee: Yamaha Corporation, Shizuoka-ken, Japan

[21] Appl. No.: 755,603

[22] Filed: Nov. 25, 1996

[30] Foreign Application Priority Data

Nov. 30, 1995 [JP] Japan .................................. 7-313185

[51] Int. Cl.$^6$ .............................. G06M 7/00; G01D 5/34
[52] U.S. Cl. ........................... 250/221; 250/229; 341/31; 200/332
[58] Field of Search ..................... 250/221, 229, 250/214 PR, 222.1; 341/31; 200/332

[56] References Cited

U.S. PATENT DOCUMENTS

| | | | |
|---|---|---|---|
| 2,008,150 | 7/1935 | Nelson | 250/229 |
| 3,275,831 | 9/1966 | Martin | 250/229 |
| 5,001,339 | 3/1991 | Starkey et al. | 250/229 |
| 5,194,919 | 3/1993 | Katayama | 250/229 |
| 5,231,283 | 7/1993 | Starkey et al. | 250/229 |

FOREIGN PATENT DOCUMENTS

| | | |
|---|---|---|
| 4-75096 | 3/1992 | Japan . |
| 6-138870 | 5/1994 | Japan . |
| 6-149233 | 5/1994 | Japan . |

Primary Examiner—Stephone B. Allen
Attorney, Agent, or Firm—Hazel & Thomas, P.C.

[57] ABSTRACT

A position transducer determines a current key position through variation of light intensity interrupted by a shutter plate attached to a key, and a semi-column shaped convex lens elongates the light beam radiated from an optical fiber in a direction parallel to the trajectory of the key so that the light beam fully covers the motion of the shutter plate.

23 Claims, 19 Drawing Sheets

POSITION TRANSDUCER HAVING OPTICAL BEAM GENERATOR FOR COVERING WIDE DETECTABLE RANGE

FIELD OF THE INVENTION

This invention relates to a position transducer for converting a position of an object to an electric signal and, more particularly, to a position transducer having an optical beam generator for covering a wide detectable range.

DESCRIPTION OF THE RELATED ART

A position transducer is incorporated in a keyboard musical instrument such as, for example, a silent piano disclosed in U.S. Pat. No. 5,374,775. The silent piano is fabricated on the basis of an acoustic piano, and a hammer stopper, position transducers, a data processing unit, a tone generator and a headphone are incorporated in the silent piano.

When the hammer stopper is moved to a free position where the hammer stopper does not impede the hammer motions, the silent piano behaves as similar to a standard acoustic piano, and a pianist plays a tune on the silent piano through the acoustic sounds.

On the other hand, if the hammer stopper is changed to a blocking position where the hammer rebounds on the hammer stopper before a strike at the strings, the silent piano behaves as an electronic keyboard musical instrument. The position transducers monitor the keys/hammers, and supply pieces of positional information of the keys/hammers to the data processing unit. The data processing unit processes the positional information in a real time manner, and produces music data codes representative of the key/hammer motions. The music data codes are supplied to the tone generator, and the tone generator tailors an audio signal from the music data codes. The audio signal is supplied to the headphone, and the player hears an electronic sound instead of the acoustic sound.

The data processing unit is expected to not only specify the depressed key but also determine a timing for generating the electronic sound and the hammer velocity in the vicinity of the associated strings. The loudness of the piano sound is proportional to the hammer velocity, and the data processing unit determines the loudness of the electronic sound from the hammer velocity.

A typical example of the position transducer available for the silent piano is implemented by a shutter plate and a photo-interrupter. A window is formed in the shutter plate, and is attached to the lower surface of a key. On the other hand, the photo-interrupter radiates an optical beam across a trajectory of the shutter plate, and the optical beam is twice interrupted by the shutter plate. While the shutter plate is being moved along the trajectory, the leading edge firstly interrupts the optical beam, thereafter, the window allows the optical beam to pass therethrough, and the inner edge defining the window interrupts the optical beam, again. The photo-interrupter changes the amount of photo-current depending upon the light intensity and, accordingly, the potential level of a key position signal. The photo-interrupter changes the key position signal to the low potential level at the first photo-interruption and the second photo-interruption, and the data processing unit estimates the hammer velocity from the key velocity calculated by dividing the distance between the leading edge and the inner edge by the time from the first photo-interruption to the second photo-interruption.

However, the key motion usually moves along a quite complicated trajectory, and it is impossible for the two photo-interruptions to exactly express the complicated trajectory. In order to match the loudness of the electronic sound with that of the piano sound to be produced through the same key motion, the photo-interrupters may be increased; however, the solution increases the production cost.

U.S. Pat. No. 5,001,339 discloses an opto-electronic sensing device available for an acoustic piano. According to the U.S. Patent, a flag and a photo-interrupter form in combination the prior art opto-electronic sensing device for one of the keys of the acoustic piano. The flag is attached to the lower surface of the key, and turns around a shaft. The photointerrupter radiates a light beam across the trajectory of the flag, and the flag has an angular shape linearly varying the amount of light of the beam depending upon the angular position thereof. A microprocessor fetches a digital key position signal representative of the amount of light, and determines the current key position. Thus, the prior art opto-electronic sensing device produces the key position signal continuously varying the value depending upon the current key position.

Japanese Patent Publication of Unexamined Application Nos. 6-138870 and 6-149233 disclose another prior art position transducer. The prior art position transducer is available for a pedal of an acoustic piano. A gray scale, which is a plate printed with a pattern discontinuously varied in brightness, and an optical reader are incorporated in the position transducer. The gray scale is attached to the pedal of the acoustic piano, and is moved together with the pedal. On the other hand, the optical reader is stationary, and optically reads the brightness. When the key is moved together with the gray scale, the brightness optically read from the gray scale is varied, and the optical reader produces a pedal position signal representative of the current pedal position.

Japanese Patent Publication of Unexamined Application No. 4-75096 discloses yet another prior art position transducer available for an acoustic piano. The prior art position transducer includes a photo-reflector provided under a key and a reflecting surface attached to the lower surface, and the photo-reflector radiates an optical beam toward the reflecting surface. When the key is moved, the intensity of reflected light is varied, and the photoreflector continuously changes a key position signal.

However, these prior art position transducers encounter problems as follows.

First, the prior art opto-electronic sensing device disclosed in the U.S. Patent has a problem in a narrow detectable range. The flag linearly varies the amount of light incident into the photo-detecting element of the photo-interrupter, and the microprocessor determines the current key position from the amount of incident light. For this reason, the detectable range is defined by the optical beam. However, the photo-interrupter commercially available merely radiates an optical beam too narrow to cover the displacement of the key of an acoustic piano. Therefore, the prior art opto-electronic sensing device needs some solution so as to widen the detectable range. Moreover, most of the photo-interrupter forms the light beam to have a round cross section, and the manufacturer is expected to precisely give the angular shape to the flag so as to achieve the linearity between the key position and the amount of incident light. Such an accurate machining is time consuming, and, accordingly, increases the production cost.

The prior art position transducer encounters a problem in the calibration. The gray scale and the optical reader are separately attached to the pedal mechanism and a stationary board member, and the relative relation therebetween is never constant. For this reason, the manufacturer is required to exactly calibrate the prior art position transducer for individual products, and the calibration consumes time and labor. Moreover, even though the prior art position transducer is calibrated before the delivery from the factory, the relative position tends to be changed due to aged deterioration, and the prior art position transducer is seriously affected by the aged deterioration.

The third prior art position transducer encounters a problem in the accuracy. As described hereinbefore, the reflector radiates a light beam to the lower surface of the key, and determines the current key position from the amount of reflected light. However, the amount of reflected light is not dominated by the distance between the reflector and the lower surface of the key. The amount of reflected light is, by way of example, varied by the surface roughness of the reflecting surface and the angle between the reflecting surface and the light beam. Therefore, the prior art position transducer can not accurately detect the current key position.

SUMMARY OF THE INVENTION

It is therefore an important object of the present invention to provide a position transducer which has a wide detectable range, an improved accuracy and a low production cost.

To accomplish the object, the present invention proposes to elongate a light beam in a direction in which a moving object is traveling along a trajectory.

In accordance with the present invention, there is provided a position transducer for determining a current position of a moving object on a trajectory extending in a first direction, comprising: a light beam source provided on one side of the trajectory for radiating a light beam having a first cross section across the trajectory; a light beam receiver provided on the other side of the trajectory, and allowing the light beam to be incident thereonto so that the moving object varies the amount of light incident onto the optical beam receiver; and a cross section modifier provided between the light beam source and the light beam receiver for modifying the light beam to have a second cross section elongated in the first direction.

BRIEF DESCRIPTION OF THE DRAWINGS

The features and advantages of the position transducer according to the present invention will be more clearly understood from the following description taken in conjunction with the accompanying drawings in which.

DESCRIPTION OF THE PREFERRED EMBODIMENT

Structure of Keyboard Musical Instrument

Figure 1:
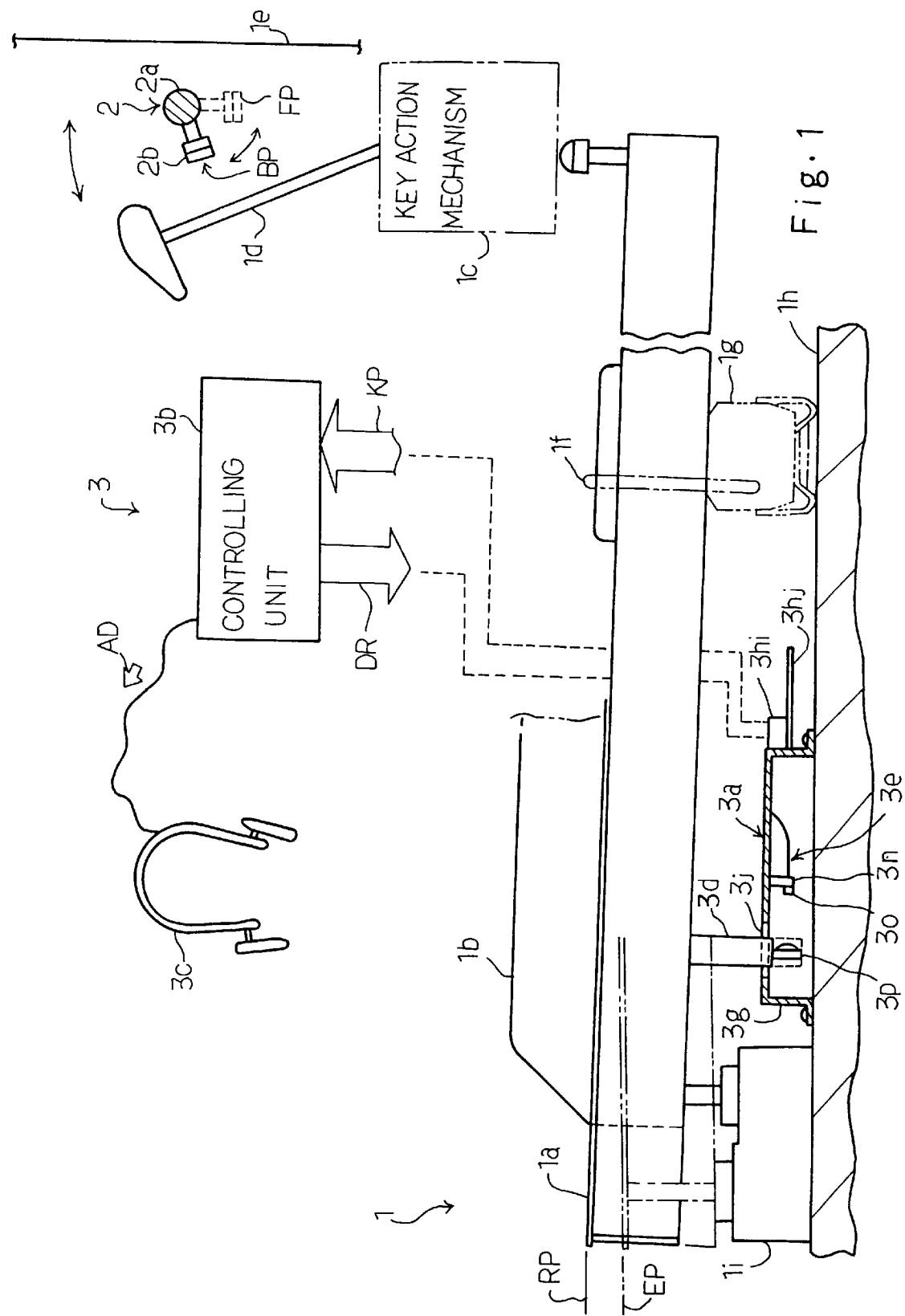
FIG. 1 is a schematic side view showing the structure of a silent piano equipped with a position transducer according to the present invention.

Referring first to FIG. 1 of the drawings, a silent piano largely comprises an acoustic piano 1, a hammer stopper 2 and an electronic sound generating system 3. In the following description, word "front" means a closer position to a player performing a tune on the piano 1 than a "rear" position, and the clockwise direction and the counter clockwise direction are determined in the figure referred to in related description.

Keys 1a/1b, key action mechanisms 1c, hammers 1d, strings 1e and damper mechanisms (not shown) are incorporated in the acoustic piano, and behave as similar to those of a standard upright piano. Eighty-eight keys 1a/1b are incorporated in the acoustic piano 1, and form in combination a keyboard. Each of the key 1a/1b is turnable around a balance pin if embedded into a balance rail 1g. When a pianist depresses a key 1a/1b, the depressed key 1a/1b is changed from a rest position RP to an end position EP. On the other hand, when the pianist releases the depressed key 1a/1b, the self-weight causes the depressed key 1a/1b to return to the rest position RP1. The standard upright piano is well known to a person skilled in the art, and, for this reason, no further description is incorporated hereinbelow.

The hammer stopper 2 includes a shaft 2a bi-directionally rotatable and cushion members 2b attached to the shaft 2a. The hammer stopper 2 is changed between a free position FP and a blocking position BP through the rotation of the shaft 2a. When the hammer stopper 2 is in the free position FP, the hammers 1d can strike the associated strings 1e so as to produce the acoustic sounds as similar to the standard upright piano. On the other hand, when the hammer stopper 2 is changed to the blocking position BP, the hammers 1d rebound on the cushion members 2b before striking the strings 1e, and no acoustic sound is produced.

The electronic sound generating system 3 includes a plurality of key sensors 3a, a controlling unit 3b and a headphone 3c. The key sensors 3a respectively monitor the keys 1a/1b, and produce key position signals KP representative of current key positions of the associated keys 1a/1b. The controlling unit 3b processes the positional information informed through the key position signals KP. The controlling unit 3b specifies depressed keys, and determines the hammer velocity, an impact timing when the associated hammer 1d would strike the string 1e and an extinctive timing when the associated damper mechanism would extinguish the acoustic sound. The controlling unit 3b produces music data codes from these pieces of information, and supplies the music data codes to a tone generator thereof. The tone generator tailors an audio signal AD for generating electronic sounds through the headphone 3c.

The key sensors 3a are provided over a key bed 1h between a front rail and the balance rail 1g under the associated keys 1a/1b. A shutter plate 3d, an optical beam generator 3e and an optical beam receiver 3f (see FIG. 2) as a whole constitute each of the key sensors 3a. Although the shutter plates 3d are respectively attached to the lower surfaces of the keys 1a/1b, each optical beam generator 3e and each optical beam receiver 3f are shared between two adjacent keys 1a/1b.

Figure 2:
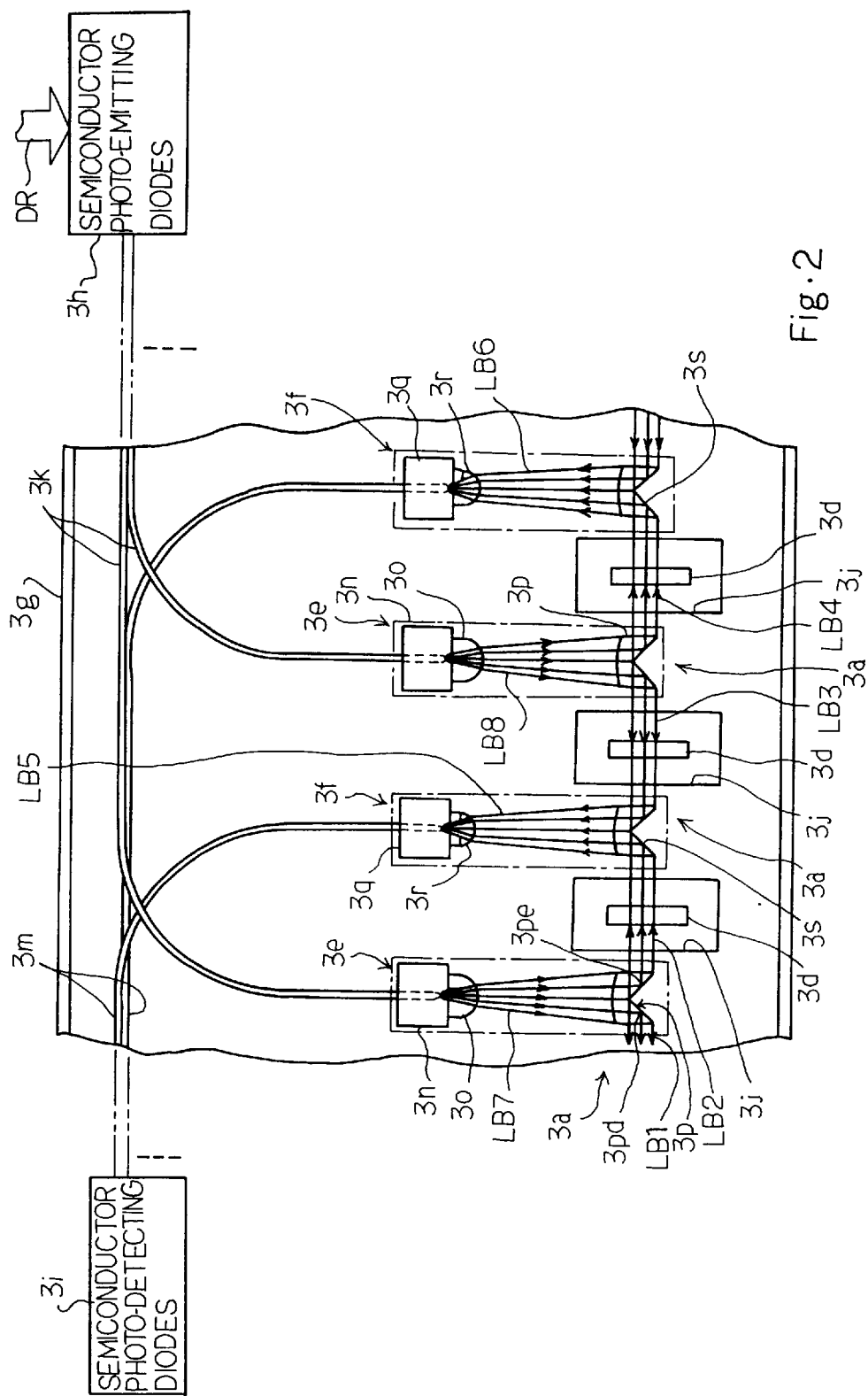
FIG. 2 is a bottom view showing key sensors incorporated in the silent piano.

The optical beam generators 3e are supported by a bracket 3g bolted to the key bed 1h, and are optically connected to semiconductor photo-emitting diodes 3h (see FIG. 2). The optical beam receivers 3f are also supported by the bracket 3g, and are optically connected to semiconductor photo-detecting diodes 3i (see FIG. 2). The semiconductor photo-emitting diodes 3h and the semiconductor photo-detecting diodes 3i are incorporated in a signal converter 3hi, and the controlling unit 3b communicates with the optical beam generators 3e and the optical beam receivers 3f through the signal converter 3hi. The semiconductor photo-emitting diodes 3h and the semiconductor photo-emitting diodes 3i are arranged on a circuit board 3hj, and the circuit board 3hj is supported by the bracket 3g. The semiconductor photo-emitting diodes 3h are responsive to driving signals DR for selectively supplying light to the optical beam generators 3e, and the semiconductor photo-detecting diodes 3i converts the light to photo-current so as to cause the signal converter 3hi to supply the key position signals KP representative of the current key positions to the controlling unit 3b.

Arrangement of Key Sensors

Turning to FIG. 2 of the drawings, the optical beam generators 3e are alternated with the optical beam receivers 3f on the back surface of the upper portion of the bracket 3g, and a plurality of slots 3j are formed in the bracket 3g between the optical beam generators 3e and the optical beam receivers 3f. The trajectory of each shutter plate 3d passes through the associated slot 3j, and the optical beam generator 3e radiates a light beam LB1/LB2/LB3/LB4 across the trajectory of the associated key 1a/1b. The light beam LB1 to LB4 is incident onto the optical beam receiver 3f, and the amount of incident light LB5/LB6 is varied depending upon the shutter position on the trajectory. Although FIG. 2 shows three key sensors, all of the eighty-eight keys 1a/1b are respectively associated with the key sensors 3a.

The semiconductor photo-emitting diodes 3h are connected through optical fibers 3k to the optical beam generators 3e. A fiber support 3n, a convex lens 3o and a sensor head 3p form in combination each of the optical beam generators 3e, and all of the optical beam generators 3 are identical in structure with each other. The optical fibers 3k are formed of acrylic resin coated with fluorine-contained resin, and supply the light of constant luminance from the semiconductor photo-emitting diodes 3h to the optical beam generators 3e.

Figure 3:
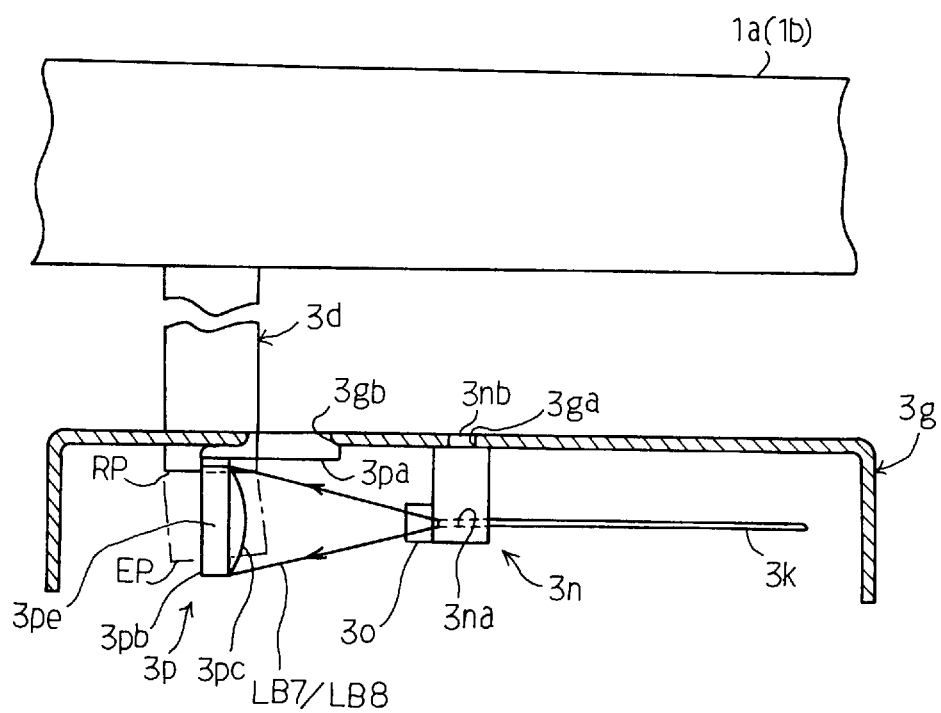
FIG. 3 is a side view showing an optical beam generator associated with one of the keys.

The fiber support 3n is formed of acrylic resin same as the optical fibers 3k, and has a cubic configuration. As will be better seen from FIG. 3, a through-hole 3na is formed in the fiber support 3n, and the through-hole 3na is directed to the sensor head 3p. The optical fiber 3k is inserted into the through-hole 3na, and is bonded to the fiber support 3n. The convex lens 3o is integrated with the fiber support 3n in such a manner that a light beam LB7/LB8 diverges toward the sensor head 3p. The convex lens 3o has a semi-column configuration, and is detailed hereinlater. A projection 3nb is formed on the top surface of the fiber support 3n, and is snugly received in a hole 3ga formed in the bracket 3g.

The sensor head 3p includes a base plate 3pa, a reflecting prism body 3pb and a convex lens 3pc. The base plate 3pa is snugly received in a hole 3gb formed in the bracket 3g, and the reflecting prism body 3pb is fixed to the base plate 3pa. The reflecting prism body 3pb is implemented by a pair of prisms, and the prism has a right angled triangle cross section (see FIG. 2). The prisms of the pair are combined in such a manner that the sloping surface of one prism is opposite to the sloping surface of the other prism. The prisms respectively provide reflecting surfaces 3pd and 3pe, and the convex lens 3pc is integrated with the other surfaces of the prisms so as to guide the light beam LB7/LB8 to the reflecting surfaces 3pd/3pe. The light beam LB7/LB8 is reflected on the reflecting surfaces 3pd/3pe, and is equally split into the light beams LB1/LB3 and LB2/LB4.

The cross section of the light beam LB7/LB8 is enlarged during the travel between the convex lens 3o and the sensor head 3p, and the divergent light beam LB7/LB8 is wide enough to cover the motion of the shutter plate 3b between the rest position RP and the end position EP. However, the semi-column shaped convex lens 3o does not widely expand the elliptical light beam LB7/LB8 in the lateral direction, and, for this reason, the convex lens 3pc has a relatively large radius of curvature, and is easily manufactured.

The optical beam receivers 3f are connected through the optical fibers 3m to the semiconductor photo-detecting diodes 3i, and are identical in structure with one another. The optical fibers 3k are formed of acrylic resin coated with fluorine-contained resin, and propagate the light incident onto the optical beam receivers 3f to the semiconductor photo-detecting diodes 3i. The semiconductor photo-detecting diodes 3i convert the light to the photo-current, and the photo-current is proportional to the amount of light incident onto the semiconductor photo-detecting diodes 3i.

The optical beam receiver 3f includes a fiber support 3q, a convex lens 3r and a sensor head 3s. The fiber support 3q and the sensor head 3s are identical with those of the optical beam generator 3e, and are compatible with the fiber support 3n and the sensor head 3p, respectively. For this reason, the fiber support 3q and the sensor head 3s are not described hereinbelow for avoiding repetition. The convex lens 3r has a semi-spherical configuration, and is integrated with the fiber support 3q.

Only one of the optical beam generator 3e and the optical beam receiver 3f is provided in the area between the slots 3j. The keys 1a/1b are arranged at small pitch, and, accordingly, the area between the slots 3j is narrow. In this situation, the alternating arrangement of the optical beam generators/receivers 3e/3f is desirable for the installation of the key sensors 3a. Moreover, the fiber supports 3n/3q are separated from the sensor heads 3p/3s, and only the sensor heads 3p/3s are positioned between the slots 3j. The manufacturer forms the wide slots 3d in the bracket 3g, and is not expected to exactly attach the shutter plates 3d to the lower surfaces of the keys 1a/1b. Moreover, the manufacturer freely regulates the magnification/ demagnification ratio of the divergent/ convergent elliptical light beams LB7/LB8 and LB5/LB6.

The fiber supports 3n/3q are located on the same side with respect to the slots 3d. A space is assigned to both optical fibers 3k/3m, and the fiber arrangement is simple.

As described hereinbefore, each of the optical beam generator 3e is shared between two shutter plates 3d, and each of the optical beam receiver 3f is also shared between two shutter plates 3d. Moreover, the optical fibers 3k are respectively connected to the optical beam generators 3e, and the optical beam receivers 3f are respectively connected to the optical fibers 3m. This means that each optical fiber 3k/3m is shared between the two shutter plates 3d. Thus, the optical fibers 3k/3m and the optical beam generators/receivers 3e/3f are small in number, and, accordingly, the manufacturer reduces the production cost of the electronic sound generating system 3.

Optical Beam Generator

Figure 4:
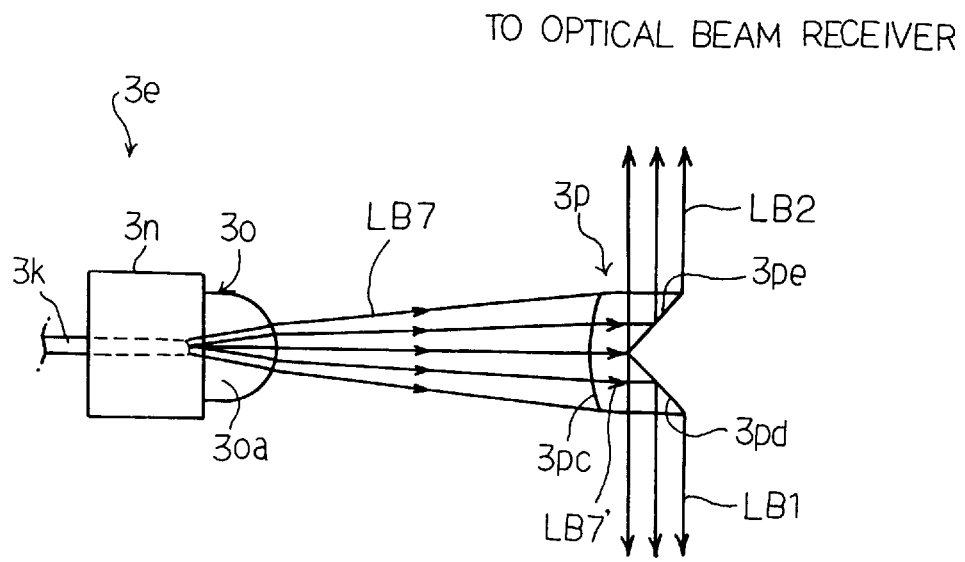
FIG. 4 is a bottom view showing the optical beam generator.
Figure 5:
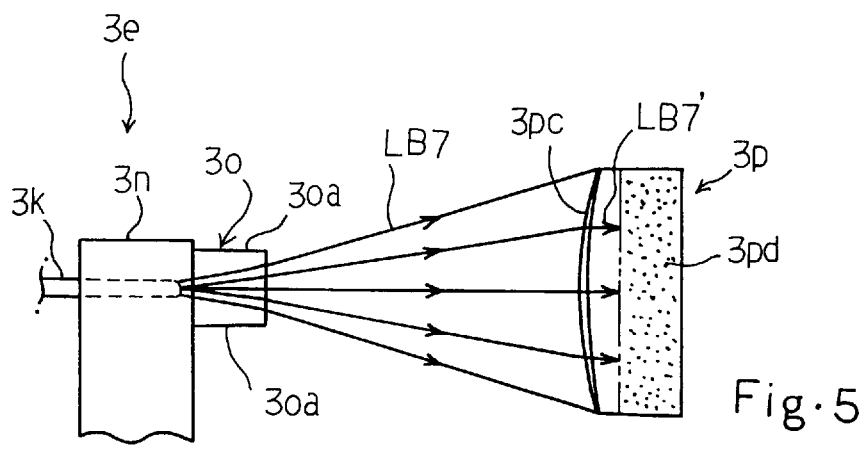
FIG. 5 is a side view showing the optical beam generator.
Figure 6:
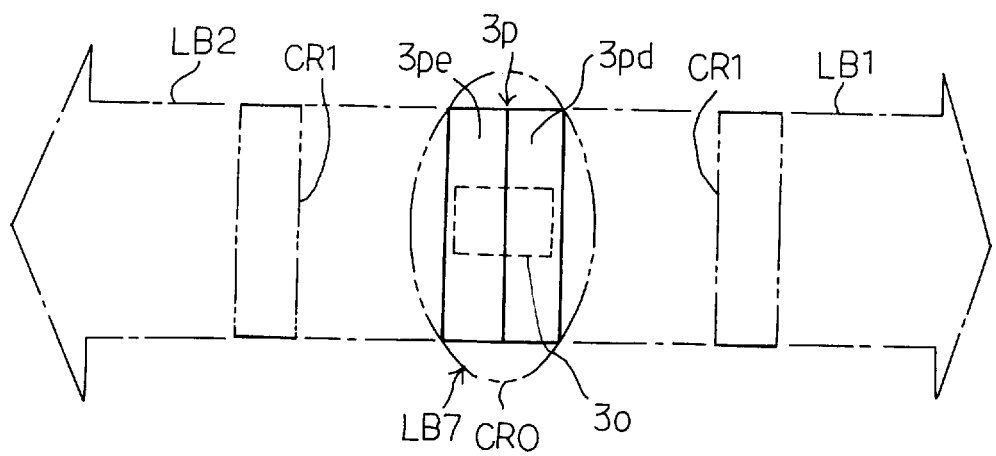
FIG. 6 is a front view showing light beams radiated from a sensor head forming a part of the optical beam generator.

Turning to FIGS. 4, 5 and 6 of the drawings, the optical beam generator 3e radiates the light beams LB1 and LB2 to the optical beam receivers 3f on both sides thereof. One of the semiconductor photo-emitting diodes 3h is responsive to the driving pulse signal DR for generating a light pulse, and the optical fiber 3k propagates the light pulse to the optical beam generator 3e. The optical beam generator 3e forms the light pulse through the light beam LB7 to the light beams LB1/LB2. Although another optical beam generator 3e also radiates the light beam LB3/LB4, the optical beam generator 3e is connected through the optical fiber 3k to another semiconductor photo-emitting diode 3h, and the semiconductor photo-emitting diodes 3h generate the light pulses at different timings. For this reason, the light beams LB2 and LB3 are not concurrently incident onto the optical beam receiver 3f shared therebetween.

The convex lens 3o has a semi-column configuration, and the semi-circular upper and lower surfaces 3oa are perpendicular to the trajectory of the shutter plate 3d. For this reason, the light beam LB7 is less refracted in the up-and-down direction, and is widely diverges from the convex lens 3o toward the sensor head 3p (see FIG. 5). However, the convex lens 3o inwardly refracts the light beam LB7 in the lateral direction, and the divergence of the light beam LB7 in the lateral direction is smaller than the divergence in the up-and-down direction as shown in FIG. 4. As a result, the light beam LB7 has an elliptical cross section CR0 as shown in FIG. 6.

The convex lens 3pc inwardly refracts the light beam LB7, and makes the divergent light beam LB7 to a parallel light beam LB7'. The reflecting surfaces 3pd/3pe are regulated in such a manner as to be inscribed in the elliptical cross section. The reflecting surfaces 3pd/3pe split the parallel light beam LB7' into the light beams LB1/LB2, and, for this reason, the light beams LB1 and LB2 are also parallel light beams. The reflecting surfaces 3pd/3pe reflect the parallel light component incident thereon, and, for this reason, the light beams LB1/LB2 have a rectangular cross section CR1. The light beam LB1 is represented by dots in FIG. 5. The reflecting surfaces 3pd/3pe have respective projected planes perpendicular to the parallel light beam LB7', and the projected planes are equal in area to each other. Thus, the reflecting surfaces equally splits the parallel light component into the light beams LB1 and LB2.

The parallel light beams LB1/LB2 are desirable. Even if the manufacturer mistakenly attached the shutter plate 3d to a position deviated from the mid position between the sensor heads 3p and 3s, the mis-alignment does not affect the relation between the current key position and the amount of light incident into the optical beam receiver 3f. Thus, the parallel light beams LB1 /LB2 make the assembling work simple.

In this instance, the optical beam generator 3e shapes the elliptical light beam LB7 into the rectangular light beams LB1/LB2, and the loss of light is smaller than that of a rectangular light beam shaped from a circular light beam.

Optical Beam Receiver

Turning back to FIGS. 2 and 3 of the drawings, the light beams LB1/LB2 cross the trajectories of the shutter plates 3d, and incident onto the optical beam receivers 3f, only one of which is shown in FIG. 2. The optical beam receiver 3f receives not only the light beam LB2 from the optical beam generator 3e on the left side thereof but also the light beam LB3 from the optical beam generator 3e on the right side thereof at different timings. For this reason, the controlling unit 3b can specify the key sensors 3a. Description is made on the light beam LB2 only for the sake of simplicity.

Figure 7:
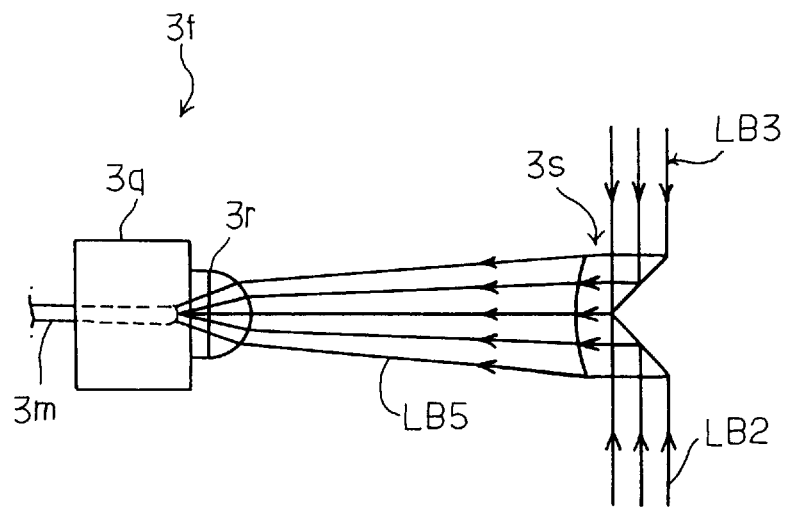
FIG. 7 is a bottom view showing the optical beam receiver.
Figure 8:
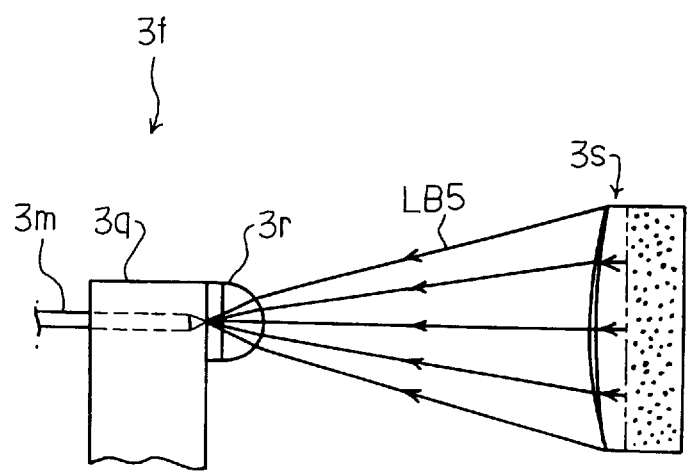
FIG. 8 is a side view showing the optical beam receiver.
Figure 9:
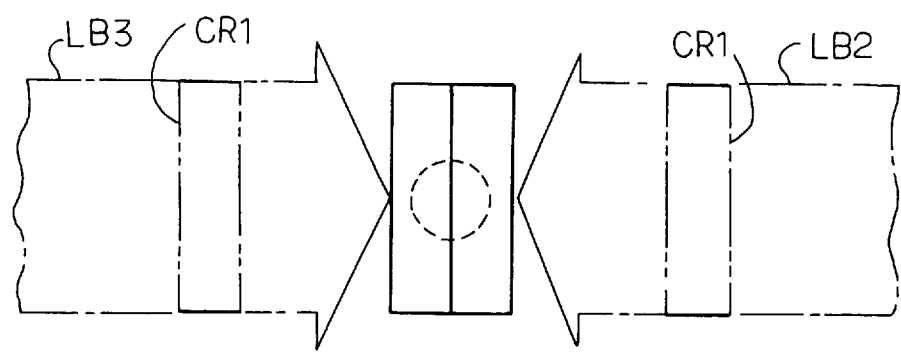
FIG. 9 is a front view showing a light beam incident onto a sensor head forming a part of the optical beam receiver.

FIGS. 7, 8 and 9 illustrate the optical beam receiver 3f. The light beam LB2 is incident on one of the reflecting surfaces of the sensor head 3s, and is represented by dots in FIG. 8. The light beam LB2 is reflected on the reflecting surface, and changes the direction through the internal reflection. As described hereinbefore, the sensor head 3s is identical with the sensor head 3p, and radiates the light beam LB5 toward the convex lens 3r. The convex lens of the sensor head 3s causes the light beam LB5 to converge toward the convex lens 3r.

The semi-spherical convex lens 3r causes the light beam LB5 to further converge toward the inlet end of the optical fiber 3m, and the incident light is propagated through the optical fiber 3m to one of the semiconductor photo-detecting diodes 3i.

Operation of Key Sensor

Figure 10:
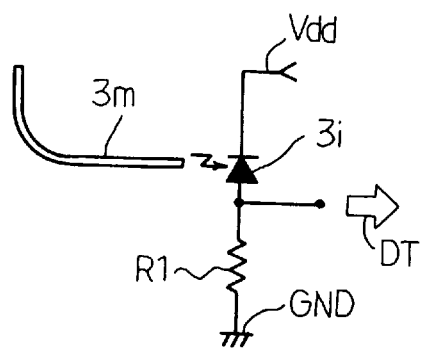
FIG. 10 is a circuit diagram showing a current-to-voltage converter connected to a semiconductor photodetecting diode.

Each of the semiconductor photo-detecting diodes 3i is connected between a power supply line Vdd and a ground line GND, and a current-to-voltage converter R1 is inserted between the semiconductor photo-detecting diode 3i and the ground line GND as shown in FIG. 10. The semiconductor photo-detecting diode 3i increases the photo-current together with the amount of light incident thereon, and the current-to-voltage converter R1 varies the potential level of an analog key position signal KP in proportional to the amount of photo-current. The current-to-voltage converters R1 form parts of the signal converter 3hi.

Assuming now that the key 1a/1b is depressed, the shutter plate 3d interrupts the light beam LB2, and the downward key motion increases the area of the light beam LB2 over lapped with the shutter plate 3d. The light beam generator 3e intermittently radiates the light beam LB2 across the trajectory of the shutter plate 3d during the downward motion of the key 1a/1b, and the amount of light beam LB2 incident on the optical beam receiver 3f is getting smaller and smaller. Accordingly, the semiconductor photo-detecting diode gradually decreases the photo-current, and, accordingly, the voltage-to-current converter R1 decreases the potential level of the analog key position signal KP. The controlling unit 3b determines the current key position between the rest position RP and the end position EP from the potential level of the analog key position signal KP. Though not shown in the drawings, an analog-to-digital converter may be further incorporated in the signal converter 3hi so as to convert the analog key position signal KP to a digital key position signal.

The light beam has the rectangular cross section CR1, and the cross section CR1 is elongated in the up-and-down direction. While the key 1a/1b is in the rest position RP, the shutter plate 3d is slightly overlapped with the rectangular cross section CR1. The overlapped area is gradually increased during the downward key motion, and is maximized when the key 1a/1b reaches the end position EP. The semi-column shaped convex lens 3o elongates the light beam LB2, and the cross section CR1 covers the trajectory of the shutter plate 3d between the rest position RP and the end position EP. Moreover, the rectangular shutter plate 3d linearly changes the overlapped area of the rectangular cross section CR1. For this reason, the analog key position signal KP linearly changes the potential level depending upon the current key position as indicated by plots PLI in FIG. 11. This results in a simple calculation for the current key position.

Figure 11:
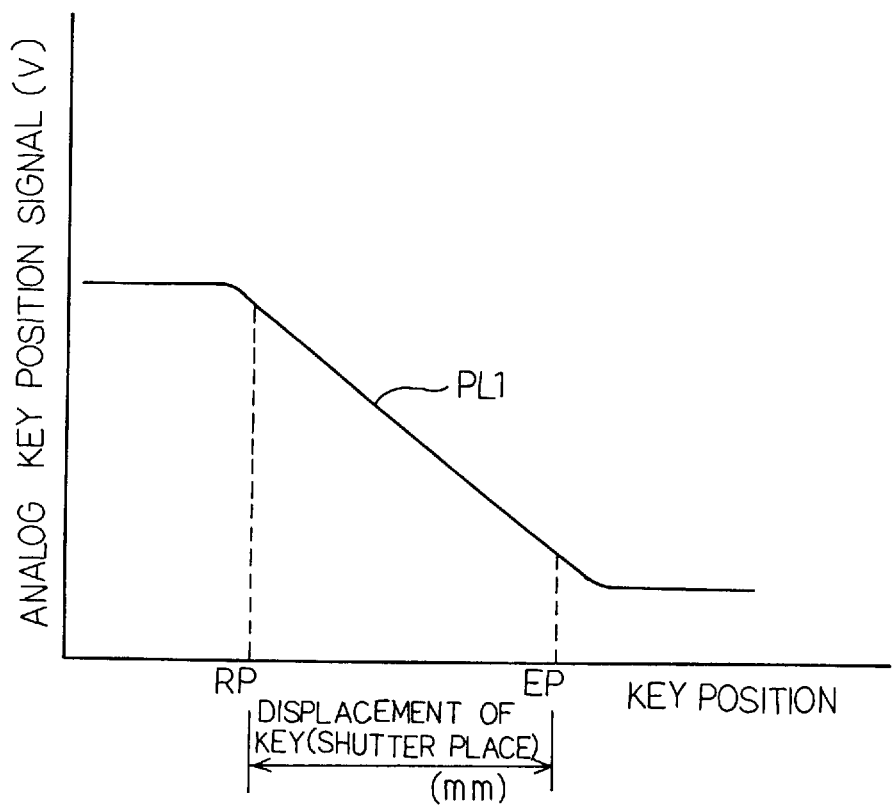
FIG. 11 is a graph showing relation between the potential level of an analog key position signal and a current key position.

The optical fiber 3k radiates a light beam circular in cross section. The convex lens 3o elongates the light beam in the up-and-down direction, and the reflecting surfaces 3pd/3pe shape the elliptical light LB7 beam into the rectangular light beams LB1/LB2. The circular light beam is uniform in intensity over the entire surface; however, the elliptical light beam LB7 is not strictly uniform in intensity over the entire surface. The elliptical light beam is fainter in the top and bottom areas rather than the side areas. Although the reflecting surfaces 3pd/3pe partially eliminate the top and bottom areas from the elliptical light beam LB7, a light-and-shade may be still left in the rectangular light beams LB1/LB2. For this reason, the key sensors 3a are arranged in such a manner that the motion of the shutter plate 3d falls within a central region of plots PL1 as shown in FIG. 11. Thus, the key sensor 3a varies the key position signal KP in exactly proportional relation with the displacement of the shutter plate 3d, and the accuracy of the positional detection is higher than that of the prior art position transducer using the reflector.

As described hereinbefore, the key sensor 3a does not merely detect an interruption of the light beam, but accurately decides the current key position between the rest position RP and the end position EP. Even if a key 1a/1b is depressed on the way from the end position to the rest position, the controlling unit 3b exactly determines the key motion. Moreover, the controlling unit 3b can calculate the key velocity from a short displacement of the key 1a/1b. For this reason, the controlling unit 3b produces the music data codes representative of an acoustic piano sound to be produced, and the headphone 3c generates an electronic sound at the same timing, the same loudness and the same duration as the acoustic piano sound.

The convex lens 3o causes the light beam LB7 to diverge toward the sensor head 3p, and the optical beam generator 3e makes the light beams LB1/LB2 wide enough to cover the range of the shutter motion between the rest position RP and the end position EP. In other words, the key sensor 3a according to the present invention does not need a plurality of photo-interrupters arranged along the trajectory of the shutter plate 3d, nor a gray scale. Moreover, the shutter plate 3d is expected to linearly increase the area overlapped with the rectangular light beam LB1/LB2. In this instance, the shutter plate 3d is implemented by a rectangular plate member, and the rectangular shutter plate 3d linearly increase the overlapped area. Finally, the key sensor 3a according to the present invention does not need a special finishing work required for the prior art position transducer using the reflector, nor a gray scale. Thus, the shutter plate 3d is simpler than the flag of the prior art opto-electronic sensing device, and the simple shutter plate 3d allows the manufacturer to reduce the production cost of the position transducer.

Figure 12:
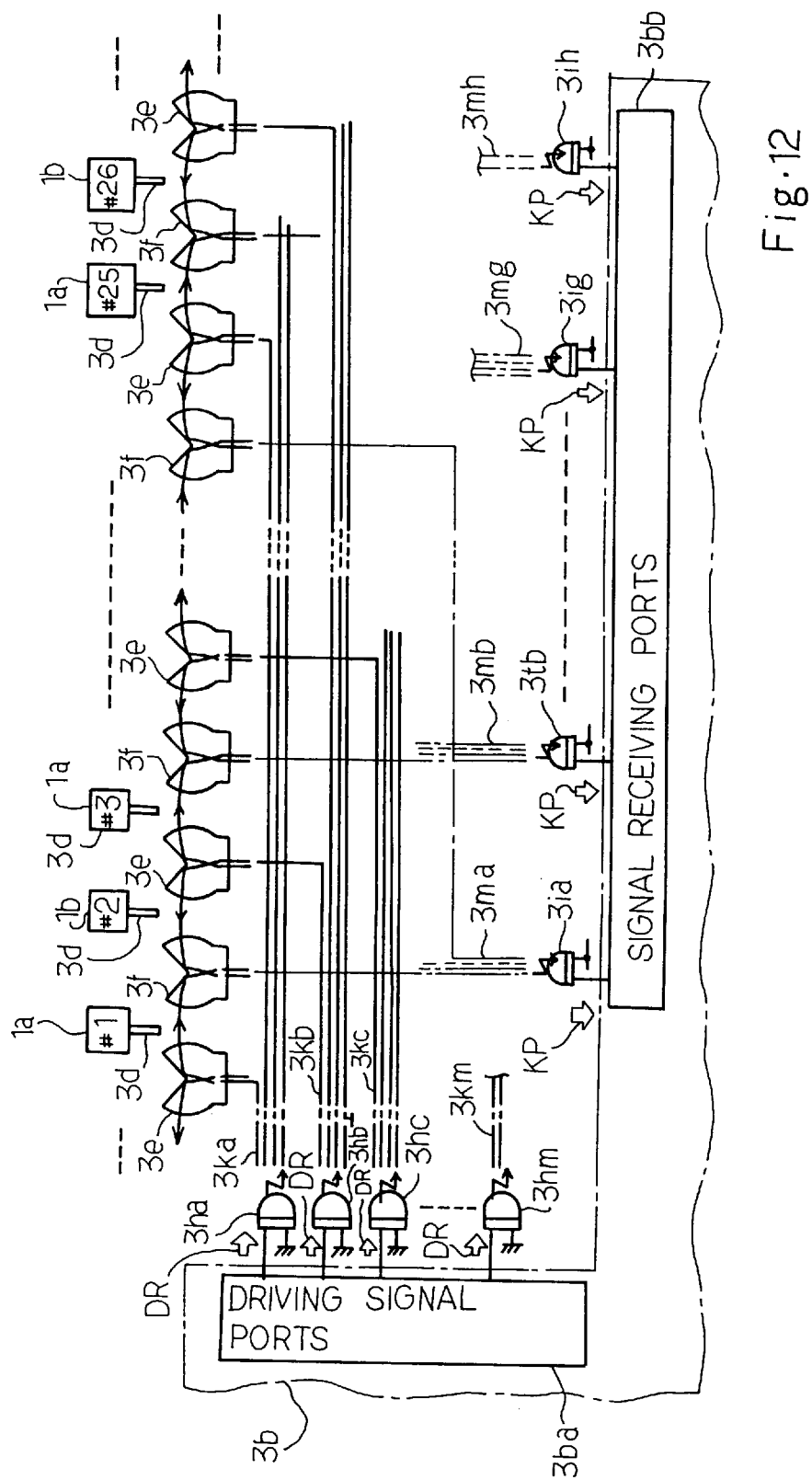
FIG. 12 is a diagram showing the arrangement of optical fibers connected between the semiconductor photo-emitting/detecting diodes and the optical beam generators/receivers.

In order to specify the individual keys monitored by the key sensors 3a, the optical fibers 3k/3m are connected between the semiconductor photo-emitting/photo-detecting diodes 3h/3i and the optical beam generators/receivers 3e/3f as shown in FIG. 12.

The optical fibers 3k are grouped into twelve bundles 3ka, 3kb, 3kc, . . . and 3km selectively connected between the semi-conductor light emitting devices 3ha, 3hb, 3hc, . . . and 3hm and the optical beam generators 3e, and the optical fibers 3m are also grouped into eight bundles 3ma, 3mb, . . . , 3mg and 3mh selectively connected between the semiconductor photo-detecting devices 3ia, 3ib, 3ic, . . . , 3ig and 3ih and the optical beam receivers 3f.

The eighty-eight keys 1a/1b are respectively numbered from #1 to #88, and we specify each of the keys 1a/1b by using the key number on the right side thereof. For example, the leftmost optical beam generator 3e and the leftmost optical beam generator 3f are assigned #1 and #2, respectively. Table 1 shows the inter-connections between the semiconductor photo-emitting diodes 3ha to 3hm and the optical beam generators 3e, and table 2 shows the interconnections between the semiconductor photo-detecting diodes 3ia to 3ih and the optical beam receivers 3f.

TABLE 1

| Photo-emitting diode | Optical Beam Generator |
|---|---|
| 3ha | #1, #25, #49, #73 |
| 3hb | #3, #27, #51, #75 |
| 3hc | #5, #29, #53, #77 |
| 3hd | #7, #31, #55, #79 |
| 3he | #9, #33, #57, #81 |
| 3hf | #11, #35, #59, #83 |
| 3hg | #13, #37, #61, #85 |
| 3hh | #15, #39, #63, #87 |
| 3hi | #17, #41, #65, #89 |
| 3hj | #19, #43, #67 |
| 3hk | #21, #45, #69 |
| 3hm | #23, #47, #71 |

TABLE 2

| Photo-detecting diode | Optical Beam Receiver |
|---|---|
| 3ia | #2, #6, #10, #14, #18, #22 |
| 3ib | #4, #8, #12, #16, #20, #24 |
| 3ic | #26, #30, #34, #38, #42, #46 |
| 3id | #28, #32, #36, #40, #44, #48 |

TABLE 2-continued

| Photo-detecting diode | Optical Beam Receiver |
| --- | --- |
| 3ie | #50, #54, #58, #62, #66, #70 |
| 3if | #52, #56, #60, #64, #68, #72 |
| 3ig | #74, #78, #82, #86 |
| 3ih | #76, #80, #84, #88 |

The controlling unit 3b has driving signal ports 3ba and signal receiving ports 3bb. The driving pulse signal DR is sequentially supplied from the driving signal ports 3ba to the semiconductor photo-emitting diodes 3ha to 3hm, and the semiconductor photo-emitting diodes 3ha to 3hm generate light pulses at different timings. When the semiconductor photo-emitting diode 3ha is energized for generating the light pulse, the other semiconductor photo-emitting diodes 3hb to 3hm are disabled, and the light pulse is distributed to the optical beam generators #1, #25, #49, #73. Subsequently, the controlling unit 3b supplies the driving pulse signal DR from the driving signal ports 3ba to the semiconductor photo-emitting diode 3hb, and the light pulse is distributed to the optical beam generators #3, #27, #51, #75. In this way, the semiconductor photo-emitting devices 3ha to 3hm are sequentially energized, and the light pulse is selectively supplied to the optical beam generators 3e. Even though each of the optical beam receivers 3f is shared between adjacent two optical beam generators 3e, the light beams LB2 and LB3 are never concurrently radiated to the same optical beam receiver 3f. For example, although the optical beam receiver #2 is shared between the optical beam generators #1 and #3, the optical beam generators #1 and #3 generate the light pulses at different timings, and the optical beam receiver #2 receives the light beam from the optical beam generators #1 and #3 at the different timings. Therefore, if the semiconductor photo-detecting diode 3ia changes the key position signal KP at the photo-emission of the semiconductor photo-emitting diode 3ha, the controlling unit 3b determines that the key position signal KP is representative of the current key position of the key #1.

In this instance, the semiconductor photo-emitting diode 3h, the optical fiber 3k and the fiber support 3n as a whole constitute the light beam source, and the convex lens 3o and the sensor head 3p form in combination the cross section modifier.

Modifications

Although a particular embodiment of the present invention has been shown and described, it will be obvious to those skilled in the art that various changes and modifications may be made without departing from the spirit and scope of the present invention.

For example, the position transducer according to the present invention may monitor the hammer instead of the key 1a/1b so as to serve as hammer sensors. Moreover, both of the key sensors and the hammer sensors may be implemented by the position transducers according to the present invention.

The key or the hammer may directly interrupt a light beam between the optical beam generator and the optical beam receiver.

The elliptical light beam LB7/LB8 may be simply reflected toward the optical beam receiver without shaping into the rectangular light beams LB1–LB4. In this instance, the potential level of the analog key position signal loses the linearity to the displacement of the key 1a/1b. For this reason, the controlling unit 3b is expected to determine the current key position through a complex calculation.

Although the optical beam generator 3e and the optical beam receiver 3f respectively have the semi-column shaped convex lens 3o and the semi-spherical convex lens 3r, both optical beam generator/receiver may have convex lenses shaped in the semi-spherical configuration. Then, the fiber support integrated with the convex lens is compatible between the optical beam generator and the optical beam receiver. However, the light beam LB7/LB8 have a circular cross section, and the reflecting surfaces 3pd/3pe shape the circular light beams LB7/LB8 into the rectangular light beams LB1 to LB4. This means that a large amount of loss takes place through the shaping.

The convex lens 3r are not limited to the semi-spherical configuration. The semi-spherical convex lens 3r focuses the light beam LB5/LB6 on the inlet end of the optical fiber 3m, and allows the light beam LB5/LB6 to slightly deviate from the center line of the semi-spherical convex lens 3r. For this reason, the semi-spherical convex lens 3r is desirable. However, the semi-column shaped convex lens 3o is available for the optical beam receiver 3f. As described hereinbefore, the convex lens 3o may have the semi-spherical configuration. If both convex lenses 3o and 3r has the same configuration, the optical beam generator 3e and the optical beam receiver 3f are compatible with each other.

Figure 13:
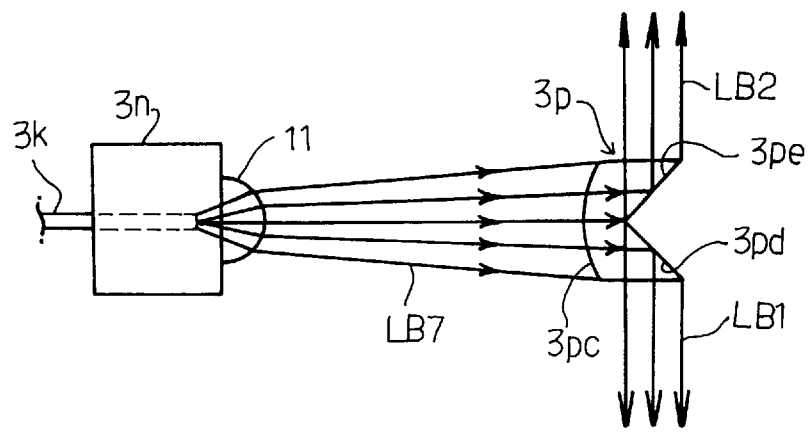
FIG. 13 is a bottom view showing a modification of the convex lens attached to the optical beam generator.
Figure 14:
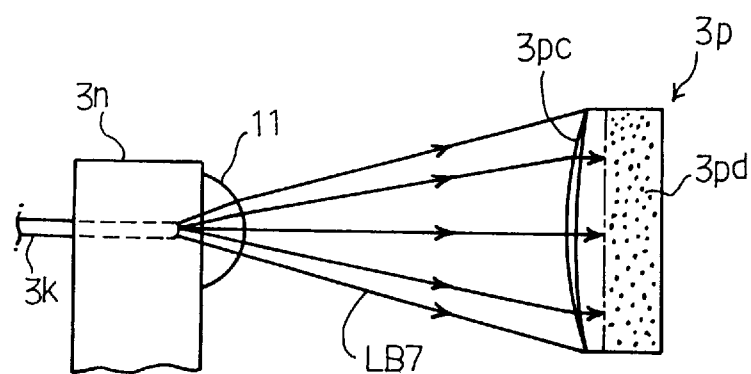
FIG. 14 is a side view showing the modification of the convex lens.
Figure 15:
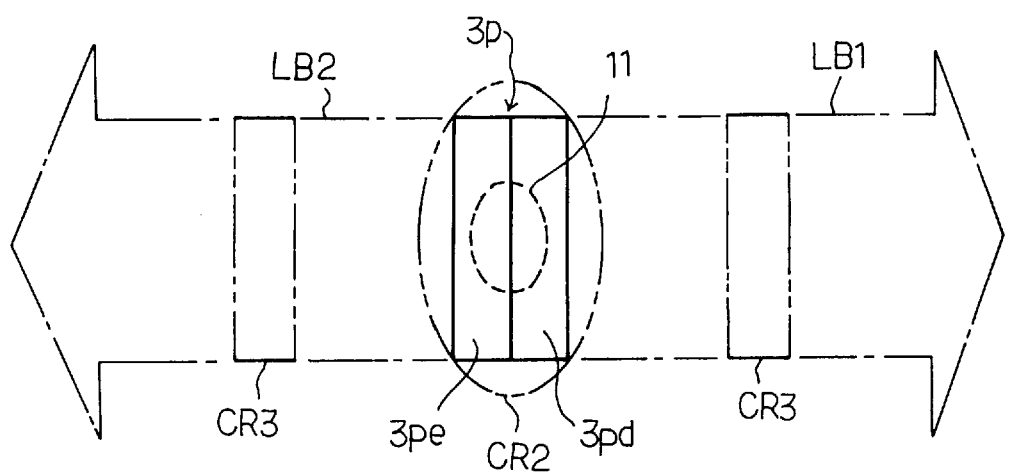
FIG. 15 is a front view showing a light beam radiated from the modification to a sensor head.

FIGS. 13 to 15 illustrate a modification of the convex lens available for the optical beam generator and/or the optical beam receiver. The modified convex lens 11 is integrated with the fiber support 3n, and causes the light beam LB7 to diverge toward the sensor head 3p. The convex lens 11 has a semi-ellipsoidal configuration and, accordingly, an elliptical cross section, and the radius of curvature is smaller on a virtual horizontal plane rather than on a virtual perpendicular plane (compare FIG. 13 with FIG. 14). For this reason, the light beam LB7 widely diverges in the up-and-down direction; however, the convex lens 11 restricts the lateral divergence in the lateral direction. The light beam LB7 has an elliptical cross section CR2, and the reflecting surfaces 3pd/3pe shape the light beam LB7 into the rectangular light beams LB1/LB2. The rectangular cross section of the light beams LB1/LB2 is labeled with CR3 in FIG. 15.

The convex lenses 3o/3r may be separated from the fiber supports 3n/3q.

Figure 16:
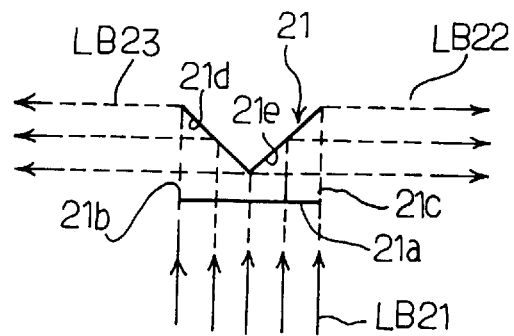
FIG. 16 is a plan view showing a first modification of the sensor head.
Figure 17:
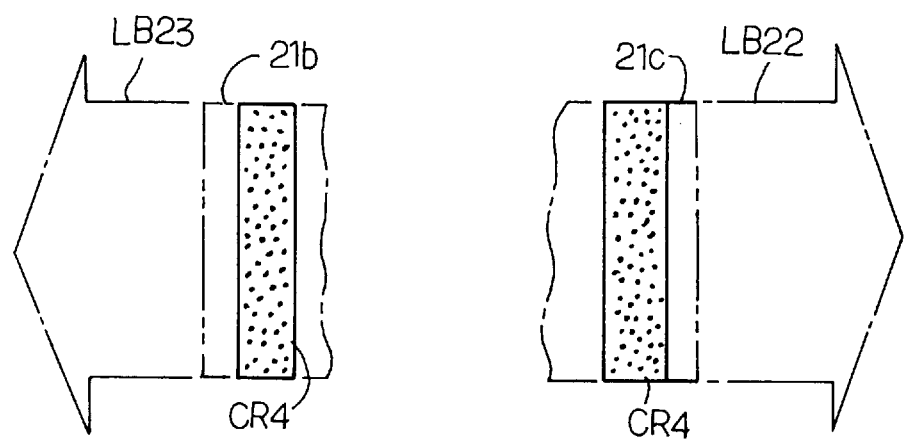
FIG. 17 is a view showing the cross section of light beams reflected on the sensor head shown in FIG. 16.

FIGS. 16 and 17 illustrate a first modification of the sensor head. The sensor head 21 illustrated in FIG. 16 is similar to the sensor head 3p except for a flat surface 21a. A light beam LB21 is incident onto the flat surface 21a, and is split into two light beams LB22 and LB23. The light beams LB22/LB23 are radiated from the flat surfaces 21b and 21c, and the cross section CR4 of the light beams LB22/LB23 is narrower than the flat side surfaces 21b/21c. In this instance, it is preferable to provide a lens which parallelizes the light beam LB21. Reflecting surfaces 21d/21e of the sensor heads 21 shape the light beams LB22/LB23 into a rectangle. When the sensor head 21 is used for the optical beam receiver 3f, it is desirable to provide a convex lens on an optical path from the sensor head 21 to the convex lens 3r.

Figure 18:
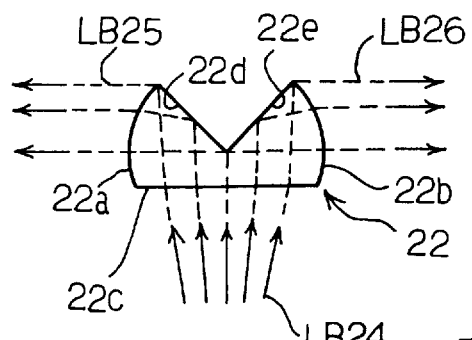
FIG. 18 is a plan view showing a second modification of the sensor head.
Figure 19:
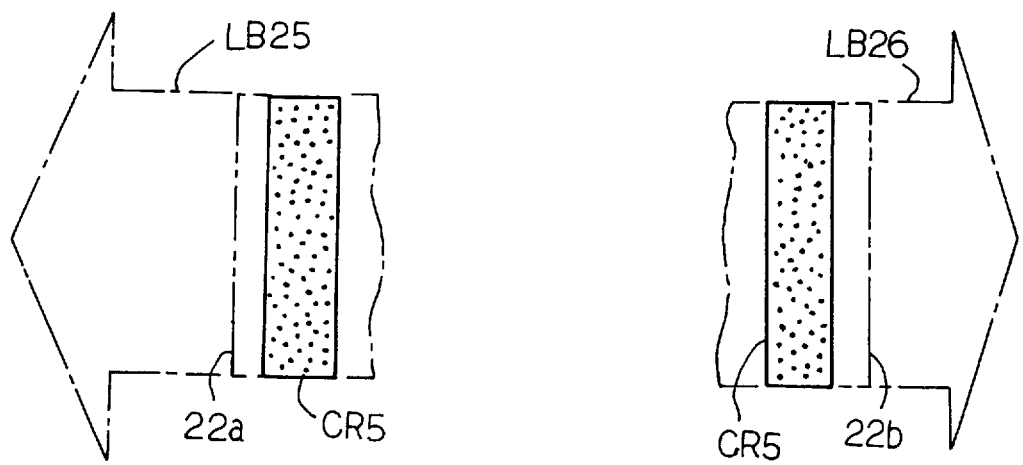
FIG. 19 is a view showing the cross section of light beams reflected on the sensor head shown in FIG. 18.
Figure 20:
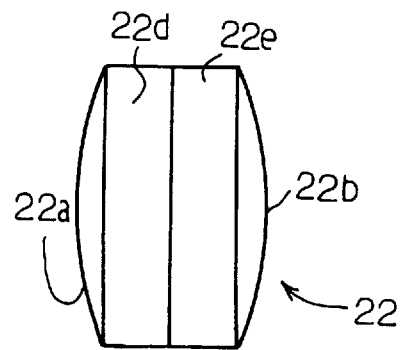
FIG. 20 is a front view showing the second modification.

FIGS. 18, 19 and 20 illustrate a second modification of the sensor head. The sensor head 22 illustrated in FIGS. 18 to 20 are similar to the sensor head 3p except for convex side surfaces 22a/22b and a flat incident surface 22c. A light beam LB24 is incident onto the flat surface 22c, and reflecting surfaces 22d and 22e split the light beam LB24 into two light beams LB25 and LB26. The convex side surfaces 22a/22b slightly refract the light beams LB25 and LB26, and make the light beams LB25/LB26 the parallel light. The second modification is also available for a sensor head of the optical beam receiver 3f.

Figure 21:
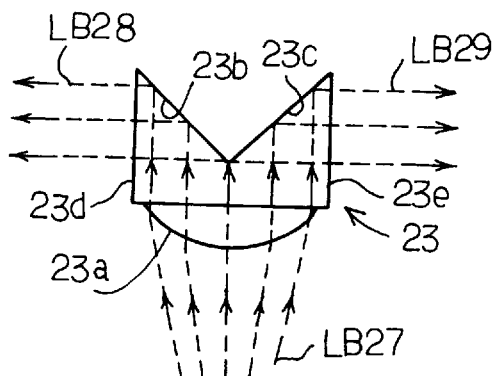
FIG. 21 is a plan view showing a third modification of the sensor head.
Figure 22:
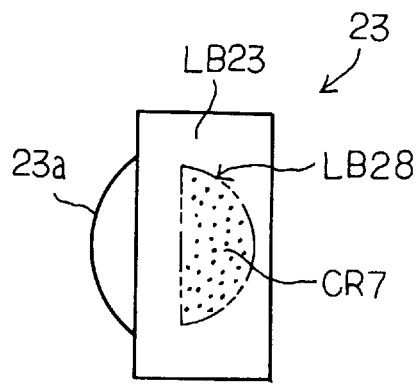
FIG. 22 is a side view showing the third modification.
Figure 23:
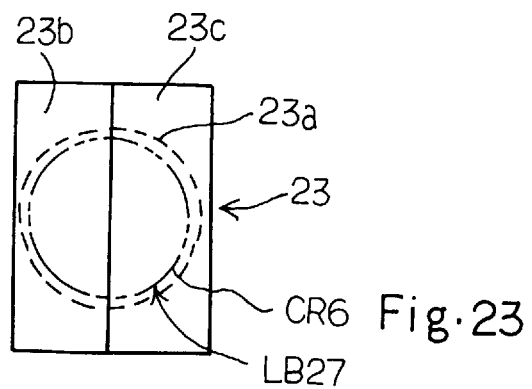
FIG. 23 is a front view showing the third modification.

FIGS. 21, 22 and 23 illustrate a third modification of the sensor head. The sensor head 23 illustrated in FIGS. 21 to 23 is suitable for a light beam LB27 radiated from a semi-spherical convex lens. The sensor head 23 is similar to the sensor head 3p except for a semi-spherical convex lens 23a. The light beam LB27 is incident on the semi-spherical convex lens 23a, and has a circular cross section CR6 smaller in radius than the semi-spherical convex lens 23a. The semi-spherical convex lens 23a makes the light beam LB27 the parallel light, and reflecting surfaces 23b/23c split the light beam LB27 into light beams LB28 and LB29. The light beams LB27 on the reflecting surfaces 23b/23c is equal in radius to the light beam LB27 incident onto the semi-spherical convex lens 23a, and the light beams LB28/LB29 are a semi-circle in cross section CR7. The semi-circular cross section CR7 is elongated in the up-and-down direction, and the reflecting surfaces 23b/23c serve as a cross section modifier.

The light beams LB28/LB29 are radiated from flat side surfaces 23d/23e, respectively. The area overlapped with the shutter plate 3d is not linearly changed; however, the all the incident light is separated into the light beams LB28/LB29, and the light beams LB28/LB29 increase the amount of photo-current.

Figure 24:
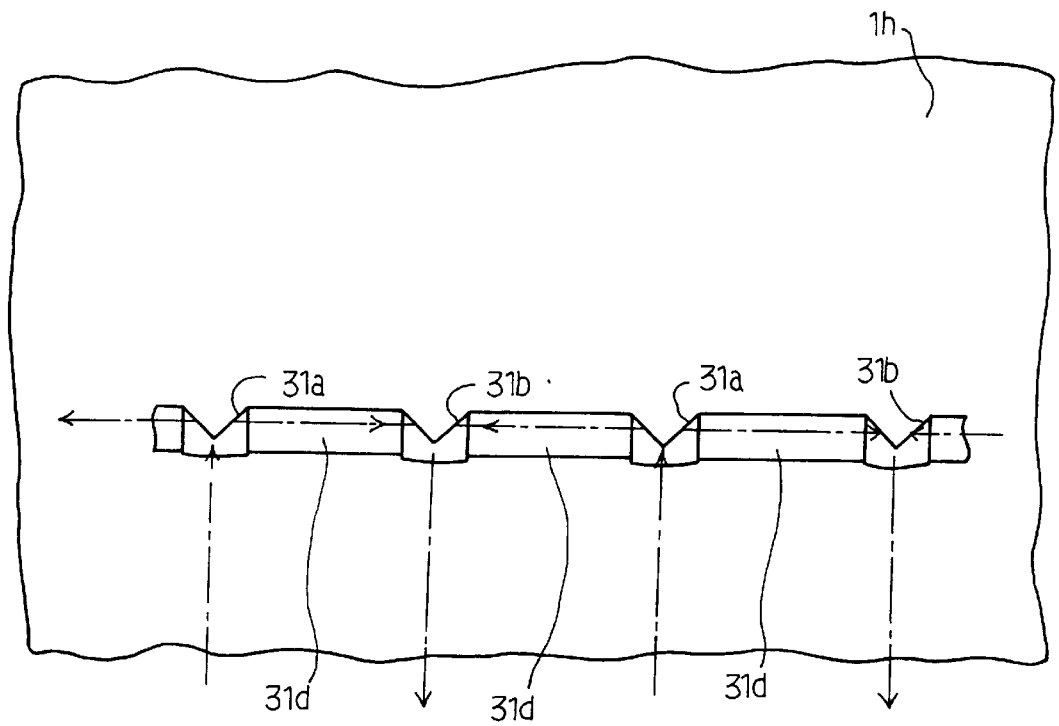
FIG. 24 is a plan view showing an array of sensor heads.
Figure 25:
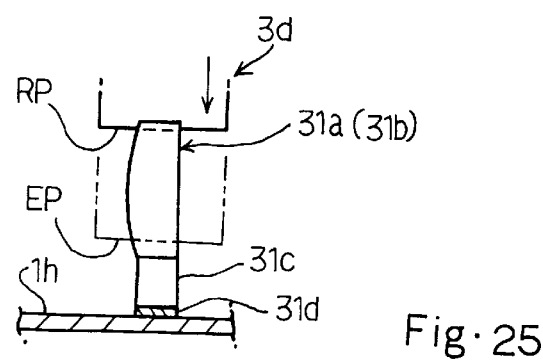
FIG. 25 is a cross sectional view showing the array of sensor heads.

FIGS. 24 and 25 illustrate an array of sensor heads 31a/31b, and the sensor heads 31a/31b are similar to the sensor heads 3p/3s, respectively. The sensor head 31a is incorporated in an optical beam generator corresponding to the optical beam generator 3e, and the sensor head 31b forms a part of an optical beam receiver corresponding to the optical beam receiver 3f. The sensor heads 31a/31b are integral with spacers 31c and a base plate 31d, and the base plate 31d is attached to the upper surface of the key bed 1h. The sensor heads 31a/31b are upright from the key bed 1h, and the shutter plates 3d are moved between the sensor heads 31a and 31b. An assembling worker simply attaches the base plate 31d to the key bed 1h, and the array of sensor heads 31a/31b makes the assembling work easier than the discrete sensor heads 3p/3r.

Figure 26:
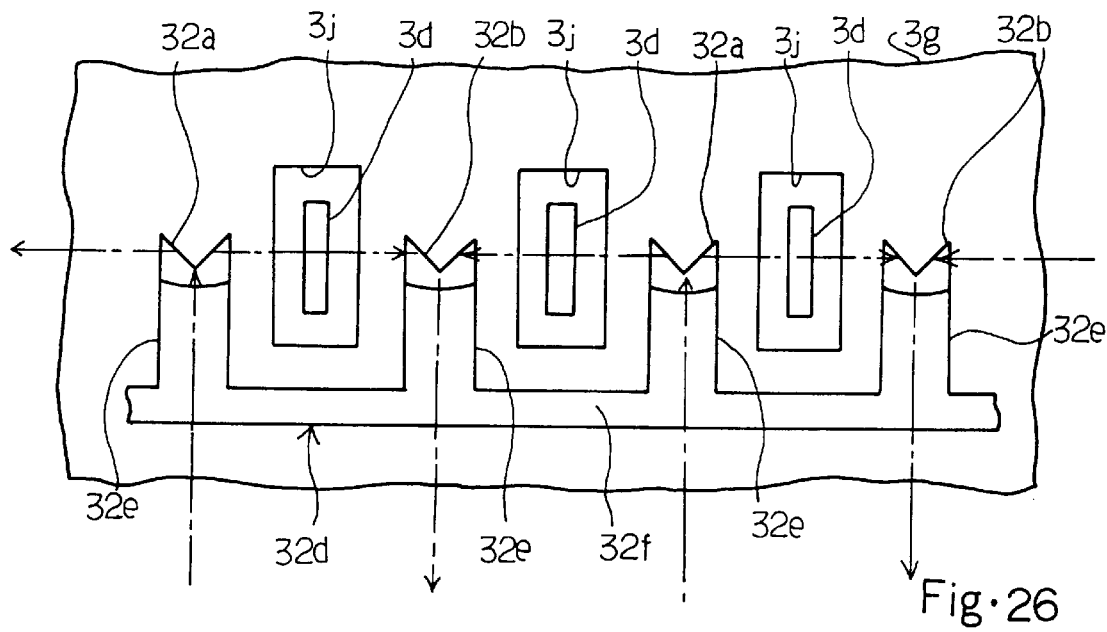
FIG. 26 is a bottom view showing another array of sensor heads.
Figure 27:
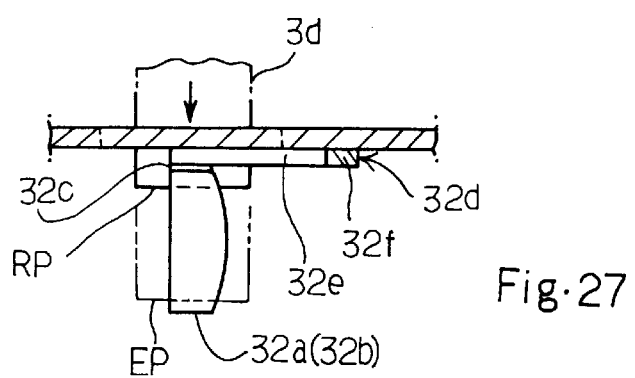
FIG. 27 is a cross sectional view showing the array of sensor heads.

FIGS. 26 and 27 illustrates another array of sensor heads 32a/32b, and the sensor heads are similar to the sensor heads 3n/3s. The sensor head 32a and the sensor head 32b are incorporated in an optical beam generator corresponding to the optical beam generator 3e and an optical beam receiver corresponding to the optical beam receiver 3f, respectively. The sensor heads 32a/32b are also integrated through spacers 32c with a base plate 32d, and the base plate 32d, and the base plate 32d is attached to the bottom surface of the bracket 3g. The base plate 32d has a comb-like configuration, and finger portions 32e project from a boss portion 32f. The slots 3j are interdigitated with the finger portions 32e, and the shutter plates 3d interrupt the light beams radiated from the sensor heads 32a. An assembling worker simply attaches the base plate 32d to the bracket 3g, and the array of sensor heads 32a/32b also make the assembling work easy.

Figure 28:
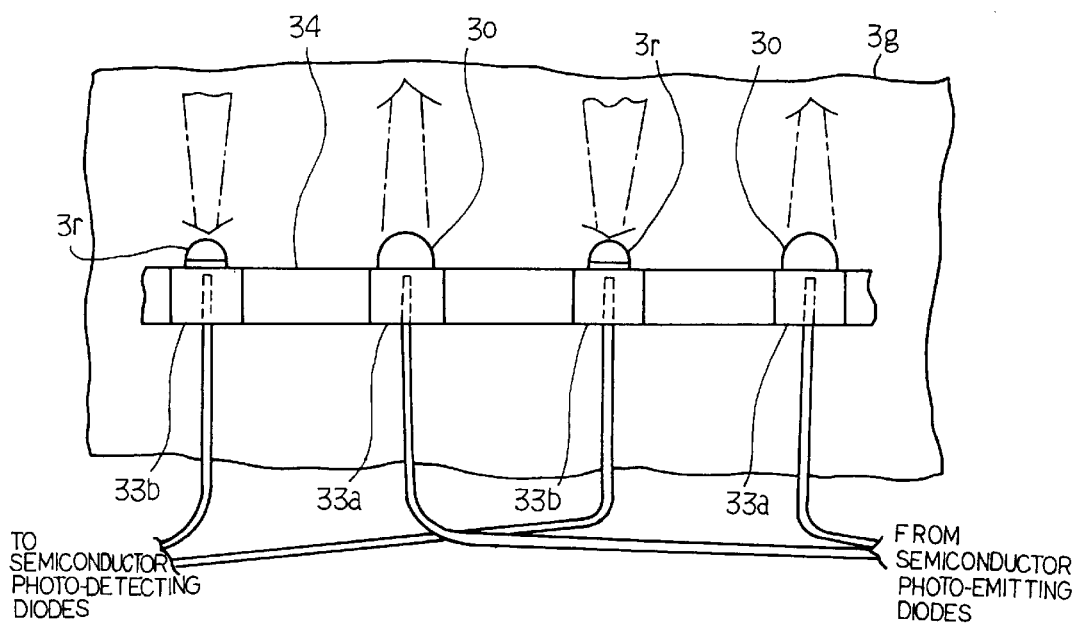
FIG. 28 is a bottom view showing an array of fiber supports.

FIG. 28 illustrates an array of fiber supports 33a/33b attached to the bottom surface of the bracket 3g. The fiber supports 33a/33b are integrated with a base plate 34, and the convex lenses 3o and 3r are further integrated with the fiber supports 33a/33b. An assembling worker simply attaches the base plate 34 to the bracket 3g, and the array of fiber supports 33a/33b makes the assembling work easy.

Figure 29:
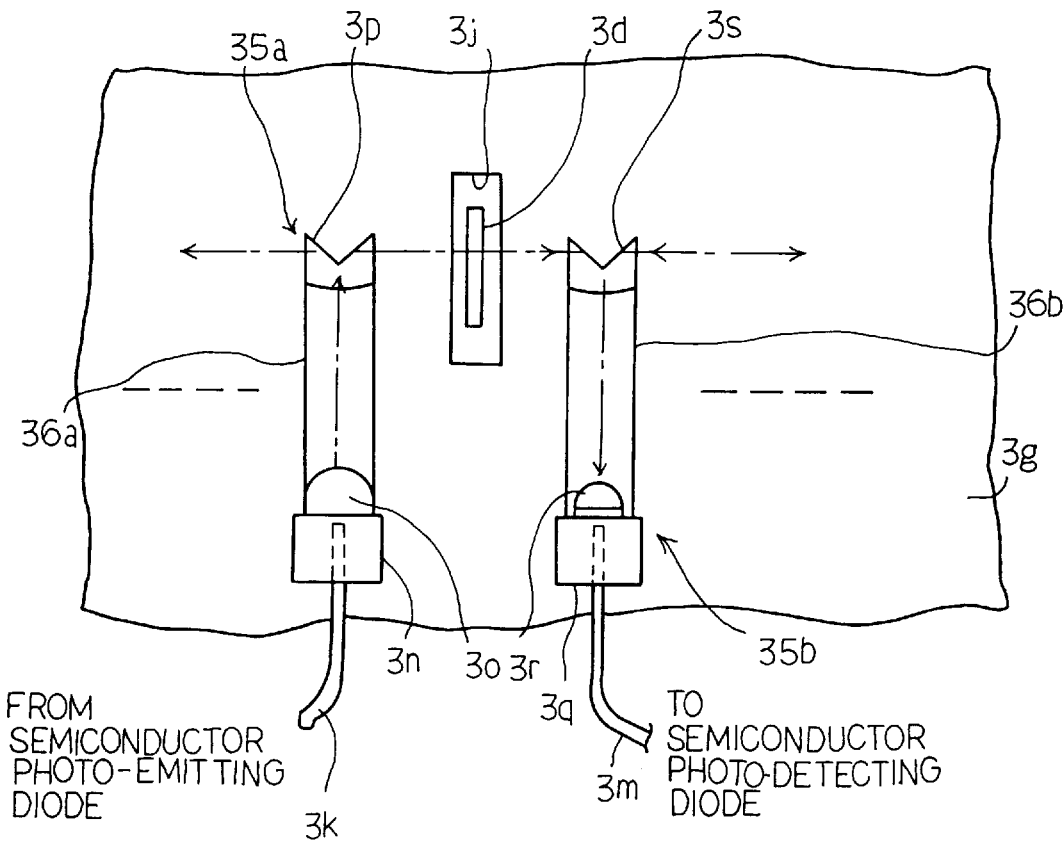
FIG. 29 is a bottom view showing an integrated optical beam generator and an integrated optical beam receiver.
Figure 30:
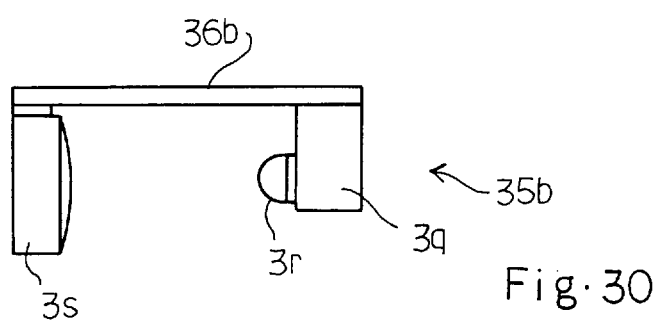
FIG. 30 is a side view showing the integrated optical beam receiver.

FIGS. 29 and 30 illustrate an integrated optical beam generator 35a and an integrated optical beam receiver 35b. The fiber support 3n and the sensor head 3p are integral with a base plate 36a, and the fiber support 3q and the sensor head 3s are also integral with a base plate 36b. An assembling worker alternately attaches the integrated optical beam generators 35a and the integrated optical beam receivers 35b on the bottom surface of the bracket 3g, and the integrated optical beam generator 35a and the integrated optical beam receiver 35b make the assembling work easy.

The application of the position transducer according to the present invention is not limited to a silent piano. The key sensors and/or hammer sensors are also required for an automatic player piano, and the position transducer according to the present invention is available for the key sensor/hammer sensor of an automatic player piano. Similarly, the position transducer according to the present invention is also applicable to a training piano, which has a stopper instead of strings, an electronic keyboard with dummy hammers and a standard electronic keyboard. Moreover, the position transducer according to the present invention is applicable to any kind of moving object.

The semiconductor photo-emitting diode and the semiconductor photo-detecting diode may be directly attached to the fiber supports 3n/3q.

A light beam radiated from the convex lens 3o may change the direction through a refraction.

An optical beam receiver may be simply implemented by the fiber support 3q attached with the convex lens 3r. In this instance, the fiber support 3q is moved to the position occupied by the sensor head 3s. A semiconductor photo-detecting diode may be directly supported by the fiber support 3q.

In the above described embodiment, the convex lens 3o elongates the optical beam LB7/LB8 in the up-and-down direction, and the cross section modifier is provided between the fiber support 3n and the shutter plate 3d. However, the cross section modifier may be provided between the shutter plate and the optical beam receiver.

In case where the cross section of the light beams LB1 to LB4 are too narrow to cover the moving range of the shutter plate, a suitable lens may be inserted into the optical paths of the light beams LB1 to LB4.

The fiber support 3n, the sensor head 3p, the sensor head 3s and the fiber support 3q may be selectively integrated with one another. Of course, all of the sensor heads 3n/3s and the fiber supports 3n/3q may be integral with one another.

Figure 31:
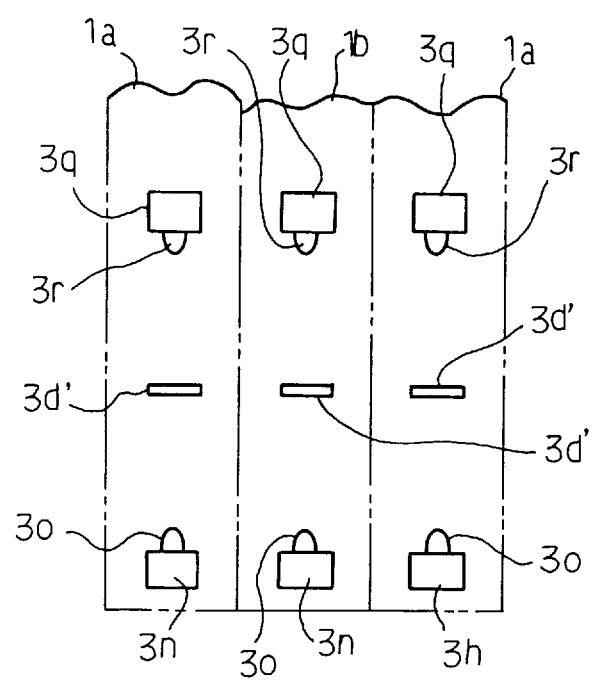
FIG. 31 is a plan view showing another layout of the key sensors.

Finally, the fiber support 3n integrated with the convex lens 3o may be directly opposed to the fiber support 3q integrated with the convex lens 3r as shown in FIG. 31. In this instance, the shutter plates 3d' are elongated in the direction of width of keys 1a/1b. In this instance, the key sensors according to the present invention are simpler than the key sensors 3a.

What is claimed is:

1. A position transducer for determining a current position of a moving object on a trajectory extending in a first direction, comprising:

a light beam source provided on one side of said trajectory for radiating a light beam having a first cross section across said trajectory;

a light beam receiver provided on the other side of said trajectory, and allowing said light beam to be incident thereonto so that said moving object varies the amount of light incident onto said optical beam receiver, thereby detecting a motion of said moving object; and a cross section modifier provided between said light beam source and said light beam receiver for modifying said light beam to have a second cross section elongated in said first direction, and physically separated from said moving object.

2. The position transducer as set forth in claim 1, in which said cross section modifier includes a lens different in reflecting power between said first direction and a second direction perpendicular to said first direction.

3. The position transducer as set forth in claim 1, in which said cross section modifier includes a light beam shaping means for shaping said second cross section into a rectangle.

4. A position transducer for determining a current position of a moving object on a trajectory extending in a first direction, comprising:
- a light beam source provided on one side of said trajectory for radiating a light beam having a first cross section across said trajectory, and implemented by an optical fiber so as to make said light beam diverge therefrom;
- a light beam receiver provided on the other side of said trajectory, and allowing said light beam to be incident thereonto so that said moving object varies the amount of light incident onto said optical beam receiver; and
- a cross section modifier provided between said light beam source and said light beam receiver for modifying said light beam to have a second cross section elongated in said first direction, and including a convex lens having a positive reflecting power in said first direction smaller than a reflecting power in said second direction.

5. The position transducer as set forth in claim 4, in which said convex lens is positioned between said optical fiber and said moving object.

6. The position transducer as set forth in claim 5, in which said optical fiber is supported by a fiber support, and said convex lens is integral with said fiber support.

7. The position transducer as set forth in claim 5, in which said convex lens is shaped into a configuration selected from the group consisting of a semi-column and a semi-ellipsoid.

8. The position transducer as set forth in claim 4, in which said cross section modifier further includes a sensor head having a reflecting surface for shaping a cross section of said light beam into a rectangle.

9. The position transducer as set forth in claim 8, in which said sensor head further has a convex surface for making said light beam a parallel light.

10. The position transducer as set forth in claim 9, in which said light beam is incident onto said convex surface, and is, thereafter, reflected on said reflecting surface.

11. The position transducer as set forth in claim 9, in which said light beam is radiated from said convex surface after reflection on said reflecting surface.

12. A position transducer for determining a current position of a moving object on a trajectory extending in a first direction, comprising:
- a light beam source provided on one side of said trajectory for radiating a light beam having a first cross section across said trajectory;
- a light beam receiver provided on the other side of said trajectory, and allowing said light beam to be incident thereonto so that said moving object varies the amount of light incident onto said optical beam receiver; and
- a cross section modifier provided between said light beam source and said light beam receiver for modifying said light beam to have a second cross section elongated in said first direction, and including a parallelerizing means for making said light beam a parallel light.

13. A position transducer for determining a current position of a moving object on a trajectory extending in a first direction, comprising:
- a light beam source provided on one side of said trajectory for radiating a light beam having a first cross section across said trajectory;
- a light beam receiver provided on the other side of said trajectory, and allowing said light beam to be incident thereonto so that said moving object varies the amount of light incident onto said optical beam receiver; and
- a cross section modifier provided between said light beam source and said light beam receiver for modifying said light beam to have a second cross section elongated in said first direction, and including a beam splitting means for splitting said light beam into two light sub-beams respectively directed toward said light beam receiver and other light beam receiver.

14. A position transducer for determining a current position of a moving object on a trajectory extending in a first direction comprising:
- a light beam source provided on one side of said trajectory for radiating a light beam having a first cross section across said trajectory;
- a light beam receiver provided on the other side of said trajectory, and allowing said light beam to be incident thereonto so that said moving object varies the amount of light incident onto said optical beam receiver; and
- a cross section modifier provided between said light beam source and said light beam receiver for modifying said light beam to have a second cross section elongated in said first direction, and including an optical path changing means for bending said optical beam toward said trajectory.

15. A position transducer for determining a current position of a moving object on a trajectory extending in a first direction, comprising:
- a light beam source provided on one side of said trajectory for radiating a light beam having a circular cross section across said trajectory;
- a light beam receiver provided on the other side of said trajectory, and allowing said light beam to be incident thereonto so that said moving object varies the amount of light incident onto said optical beam receiver; and
- a cross section modifier provided between said light beam source and said light beam receiver for modifying said light beam to have a second cross section elongated in said first direction, and including a reflecting surface for splitting said light beam into two light sub-beams each having a semi-circular cross section.

16. The position transducer as set forth in claim 15, in which said cross section modifier further includes a convex lens for making said light beam a parallel light before the reflection on said reflecting surface.

17. A position transducer for determining a current position of a moving object on a trajectory extending in a first direction, comprising:
- a light beam source provided on one side of said trajectory for radiating a light beam having a first cross section across said trajectory, implemented by an optical fiber support by a first fiber support;
- a light beam receiver provided on the other side of said trajectory, and allowing said light beam to be incident thereonto so that said moving object varies the amount of light incident onto said optical beam receiver; and
- a cross section modifier provided between said light beam source and said light beam receiver for modifying said light beam to have a second cross section elongated in said first direction, and including:
  - a convex lens receiving said light beam from said optical fiber and having a positive refracting power smaller in said first direction than a refracting power in a second direction perpendicular to said first direction; and a sensor head receiving said light beam from said convex lens and shaping said light beam into a rectangular cross section elongated in said first direction for radiating said light beam with said rectangular cross section toward said moving object.

18. The position transducer as set forth in claim 17, in which said fiber support, said convex lens and said sensor head are integrated together.

19. A position transducer for determining a current position of a moving object on a trajectory extending in a first direction, comprising:

a light beam source provided on one side of said trajectory for radiating a light beam having a first cross section across said trajectory, and implemented by an optical fiber supported by a first fiber support;

a light beam receiver provided on the other side of said trajectory, and allowing said light beam to be incident thereonto so that said moving object varies the amount of light incident onto said optical beam receiver; and a cross section modifier provided between said light beam source and said light beam receiver for modifying said light beam to have a second cross section elongated in said first direction, and including:

a first convex lens receiving said light beam from said optical fiber and having a positive refracting power smaller in said first direction than a refracting power in a second direction perpendicular to said first direction; and a first sensor head receiving said light beam from said convex lens and radiating said light beam with said rectangular cross section toward said moving object; and said light beam receiver includes:

a second sensor head receiving said light beam passing through said trajectory and bending said light beam at a certain angle;

a second optical fiber supported by a second fiber support; and a second convex lens for causing said light beam from said second sensor head to converge toward said second optical fiber.

20. The position transducer as set forth in claim 19, in which said first sensor head is integrated with said second sensor head.

21. The position transducer as set forth in claim 19, in which said first fiber support, said first convex lens and said first sensor head are integrated together, and said second fiber support, said second convex lens and said second sensor head are integrated together.

22. The position transducer as set forth in claim 19, in which said first fiber support is integral with said second fiber support.

23. The position transducer as set forth in claim 19, in which said first sensor head is compatible with said second sensor head.

* * * * *